United States Patent
Khandelwal (10) Patent No.: US 9,705,329 B2
(45) Date of Patent: Jul. 11, 2017

(54) PROACTIVE INTELLIGENT LOAD SHEDDING

(71) Applicant: Tanuj Khandelwal, Irvine, CA (US)

(72) Inventor: Tanuj Khandelwal, Irvine, CA (US)

(73) Assignee: OPERATION TECHNOLOGY, INC., Irvine, CA (US)

(*) Notice: Subject to any disclaimer, the term of this patent is extended or adjusted under 35 U.S.C. 154(b) by 417 days.

(21) Appl. No.: 13/933,014

(22) Filed: Jul. 1, 2013

(65) Prior Publication Data

US 2014/0001847 A1 Jan. 2, 2014

Related U.S. Application Data (60) Provisional application No. 61/666,716, filed on Jun. 29, 2012.

(51) Int. Cl.
    *H02J 3/14* (2006.01)
    *H02J 13/00* (2006.01)
    *H02J 3/00* (2006.01)

(52) U.S. Cl.
    CPC ............ *H02J 3/14* (2013.01); *H02J 13/0006* (2013.01); *H02J 13/0024* (2013.01); *H02J 2003/007* (2013.01); *Y02B 70/3225* (2013.01); *Y04S 20/222* (2013.01); *Y10T 307/25* (2015.04)

(58) Field of Classification Search
    None
    See application file for complete search history.

(56) References Cited

U.S. PATENT DOCUMENTS

| | | | | |
|---|---|---|---|---|
| 5,414,640 A | * | 5/1995 | Seem | H02J 3/14 307/35 |
| 5,625,751 A | * | 4/1997 | Brandwajn | H02J 3/24 706/20 |
| 5,629,862 A | * | 5/1997 | Brandwajn | H02J 3/00 307/20 |
| 5,745,368 A | * | 4/1998 | Ejebe | H02J 3/00 307/102 |
| 7,356,422 B2 | * | 4/2008 | Schweitzer, III | H02J 3/14 702/57 |
| 7,693,608 B2 | | 4/2010 | Nasle | |
| 7,729,808 B2 | | 6/2010 | Nasle et al. | |
| 7,826,990 B2 | | 11/2010 | Nasle et al. | |
| 7,840,395 B2 | | 11/2010 | Nasle et al. | |
| 7,840,396 B2 | | 11/2010 | Radibratovic et al. | |
| 7,844,439 B2 | | 11/2010 | Nasle et al. | |
| 7,844,440 B2 | | 11/2010 | Nasle et al. | |
| 8,036,872 B2 | | 10/2011 | Nasle | |
| 8,126,685 B2 | | 2/2012 | Nasle | |

(Continued)

OTHER PUBLICATIONS

F. Shokooh, J. J. Dai, S. Shokook, J. Tastet, H. Castro, T. Khandelwal, G. Donner, "Intelligent load shedding", Jan. 20, 2011, IEEE, IEEE Industry Applications Magazine, vol. 17, Issue 2, March-April, pp. 44-53.*

(Continued)

*Primary Examiner* — Rexford Barnie
*Assistant Examiner* — David Shiao
(74) *Attorney, Agent, or Firm* — One LLP (57) ABSTRACT

A power control system utilizing real-time power system operating data to effectuate predictive load shedding so as to accurately predict the need for and the optimal type of responsive action to a contingency—before the contingency actually occurs.

7 Claims, 8 Drawing Sheets

(56) References Cited

U.S. PATENT DOCUMENTS

| | | |
|---|---|---|
| 8,131,401 B2 | 3/2012 | Nasle |
| 8,155,908 B2 | 4/2012 | Nasle et al. |
| 8,155,943 B2 | 4/2012 | Nasle |
| 8,165,723 B2 | 4/2012 | Nasle |
| 8,170,856 B2 | 5/2012 | Nasle |
| 8,180,622 B2 | 5/2012 | Nasle |
| 8,229,722 B2 | 7/2012 | Nasle |
| 8,239,070 B1 * | 8/2012 | Schlueter .................. H02J 3/00 700/286 |
| 8,321,194 B2 | 11/2012 | Meagher et al. |
| 8,401,833 B2 | 3/2013 | Radibratovic et al. |
| 8,494,830 B2 | 7/2013 | Radibratovic et al. |
| 8,554,385 B2 * | 10/2013 | Donolo ..................... H02J 3/12 290/44 |
| 8,577,661 B2 | 11/2013 | Nasle |
| 8,606,422 B2 * | 12/2013 | Sun ........................... H02J 3/14 700/292 |
| 8,688,429 B2 | 4/2014 | Nasle et al. |
| 8,775,934 B2 | 7/2014 | Nasle et al. |
| 8,868,398 B2 | 10/2014 | Radibratovic et al. |
| 8,959,006 B2 | 2/2015 | Nasle |
| 9,031,824 B2 | 5/2015 | Nasle |
| 9,092,593 B2 | 7/2015 | Nasle |
| 9,111,057 B2 | 8/2015 | Radibratovic et al. |
| 9,557,723 B2 | 1/2017 | Nasle |
| 2003/0200010 A1 * | 10/2003 | Chiang ..................... H02J 3/24 700/286 |
| 2009/0113049 A1 | 4/2009 | Nasle et al. |
| 2011/0066301 A1 * | 3/2011 | Donolo ..................... H02J 3/12 700/292 |
| 2011/0082597 A1 | 4/2011 | Meagher |
| 2013/0035800 A1 * | 2/2013 | Kulathu ..................... H02J 3/14 700/295 |
| 2013/0085624 A1 * | 4/2013 | Yang ........................ H02J 3/14 700/297 |
| 2013/0218494 A1 * | 8/2013 | Chiang ................. G01R 21/006 702/61 |
| 2015/0112907 A1 | 4/2015 | Nasle et al. |
| 2015/0153757 A1 | 6/2015 | Meagher |
| 2015/0178627 A1 | 6/2015 | Radibratovic et al. |
| 2015/0248617 A1 | 9/2015 | Nasle |
| 2016/0048757 A1 | 2/2016 | Nasle et al. |
| 2016/0196375 A1 | 7/2016 | Nasle |
| 2016/0246905 A1 | 8/2016 | Radibratovic et al. |
| 2016/0246906 A1 | 8/2016 | Radibratovic et al. |
| 2016/0247065 A1 | 8/2016 | Nasle et al. |
| 2017/0046458 A1 | 2/2017 | Meagher et al. |

OTHER PUBLICATIONS

R. C. Hardiman, M. Kumbale, Y. V. Makarov, "An advanced tool for analyzing multiple cascading failures", Sep. 12-16, 2004, IEEE, 2004 International Conference on Probabilistic Methods Applied to Power Systems.*

B. Stott, O. Alsac, A. J. Monticelli, "Security analysis and optimization", Jun. 28, 2005, IEEE, Proceedings of the IEEE, vol. 75, Issue 12, Dec. 1987, pp. 1623-1644.*

* cited by examiner

PROACTIVE INTELLIGENT LOAD SHEDDING

CROSS-REFERENCE TO RELATED APPLICATIONS

This application is based on U.S. Provisional Application No. 61/666,716, filed on Jun. 29, 2012, the contents and disclosure of which are herein incorporated by reference.

BACKGROUND OF THE INVENTION

In electrical power systems, power generation and load demand must be balanced at all times. In the event load demand is higher than the current power generation, load shedding must be initiated in order to correct the imbalance and maintain system stability and operability. This balance is reflected in the frequency response of the power system, i.e. how the frequency of the generated power aligns with a target frequency reflecting a stable system, e.g. 60 Hz. For example, when load demand becomes greater than power generation, the frequency of the generated power will drop, unless and until either the power generation increase accordingly, or the excess load is removed.

Load shedding is the removal of excess load from a power system to keep the system stable and operational. Load shedding is typically in response to one or more system disturbances, also known as "triggers" or "contingencies," that result in a power generation deficiency condition, i.e. a reduction in power generation. Common contingencies that can cause a deficiency condition include faults, loss of generation, switching errors, lightning strikes, and other similar events.

Sudden and large changes in power generation capacity, e.g. through the loss of a generator or main inter-tie, may impact the dynamic response of the prime mover, which can produce severe power generation and load imbalances, resulting in rapid frequency decline. For some disturbances, notably those resulting in a loss of generation or a system islanding effect, the cascading effects of these sudden and large power generation changes may be of primary concern. Indeed, if load shedding is not set and timed correctly these cascading effects may cause more of a risk to overall system stability than the initial event itself.

For example, a short circuit at a power station busbar may initially result in an acceleration of the generator prime movers (e.g. turbines) due to the decreased load sensed by the power system because of the fault, i.e. frequency rises above the target. When this occurs, a speed regulator may act to decelerate the prime movers in order to correct the imbalance, i.e. lower the frequency to the target. However, once the fault clears, the prime movers face are faced with the impact of the actually still connected load, i.e. frequency is actually below target, except now under difficult reacceleration conditions.

This drop in system frequency may instigate a rapid fall of power output to the auxiliary loads, causing further reductions of the energy input to the generator prime movers. This sequence of events may further deteriorate the system frequency, endangering the entire power system. To halt the drop in system frequency, it is necessary to intentionally disconnect a portion of the load equal to or greater than the generation deficiency in order to achieve balanced power economics while maintaining system stability. Automated load shedding systems are therefore necessary for industrial power systems since sudden disturbances can plunge a power system into a hazardous state much faster than an operator can react.

Conventional automated load shedding schemes utilize fixed frequency settings with fixed frequency relays. For example, an under-frequency rely load shedding scheme utilizes fixed load reduction at fixed system frequency levels. If the power system frequency falls below a frequency set point for a pre-specified period of time, the frequency relay trips one or more load breakers, i.e. sheds a pre-determined load or loads. This cycle is repeated until the power system frequency is recovered, e.g. 10% load reduction for every 0.5% frequency drop. However, in the time it takes for the frequency relay to trip the load breakers to shed the predetermined load(s) for that frequency level, the frequency may have degenerated past the level where such a response is sufficient, instigating successive load shedding operations in the face of a continuingly degenerative frequency level, and risking total system failure.

Unfortunately, the amount of load shed under such schemes is typically quite conservative, often resulting in excessive or insufficient load shedding. This is because, typically, there is a complete lack of knowledge about the actual system operating conditions, as well as the types of disturbances and their locations within the system. Indeed, these load shedding schemes rely on pre-programmed load priority tables that are developed in advance of the power system's actual operation (i.e. during a "study phase") and that are static (i.e. time invariant). The result is that the amount of load shed is not tailored to address actual power system conditions as they occur during operation.

Indeed, these conventional load shedding schemes have the inherent limitation that the contingencies, i.e. events resulting in power generation deficiency, on which these load priority tables are based are pre-programmed simulations which, at best, are simply educated guesses about what actual contingencies the power system may encounter and what the appropriate response would be. Hence, the associated load priority tables are only as good as the number of contingencies envisioned by the engineer who sets up the simulations. These tables will necessarily not include all possible contingencies, leaving the system vulnerable to contingencies that may cause system instability and/or failure. Moreover, these contingencies (and associated responses) while valid for the set of operating conditions for which they were created, are often inapplicable to the changing operating conditions of actual system operation. In short, the actual operating conditions of the power system are generally not those of the simulation.

It is therefore desirable to provide a proactive load shedding system that can predict the need for and the optimal type of responsive load shedding action to a contingency based on the actual operating conditions of a power system.

BRIEF SUMMARY OF THE INVENTION

Briefly, and in general terms, the present invention provides for a power control system utilizing real-time power system operating data to effectuate predictive load shedding so as to accurately predict the need for and the optimal type of responsive action to a contingency—before the contingency actually occurs.

These and other aspects and advantages of the invention will be apparent from the following detailed description and the accompanying drawing, which illustrates by way of example the features of the invention.

BRIEF DESCRIPTION OF THE SEVERAL VIEWS OF THE DRAWING(S)

Illustrated in the accompanying drawing(s) is at least one of the best mode embodiments of the present invention. It should be understood that what is illustrated is set forth only for the purposes of example and should not be taken as a limitation on the scope of the invention described herein. In such drawing(s).

DETAILED DESCRIPTION OF THE PREFERRED EMBODIMENTS

The above described drawing figures illustrate the described invention in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated and/or described.

Figure 1:
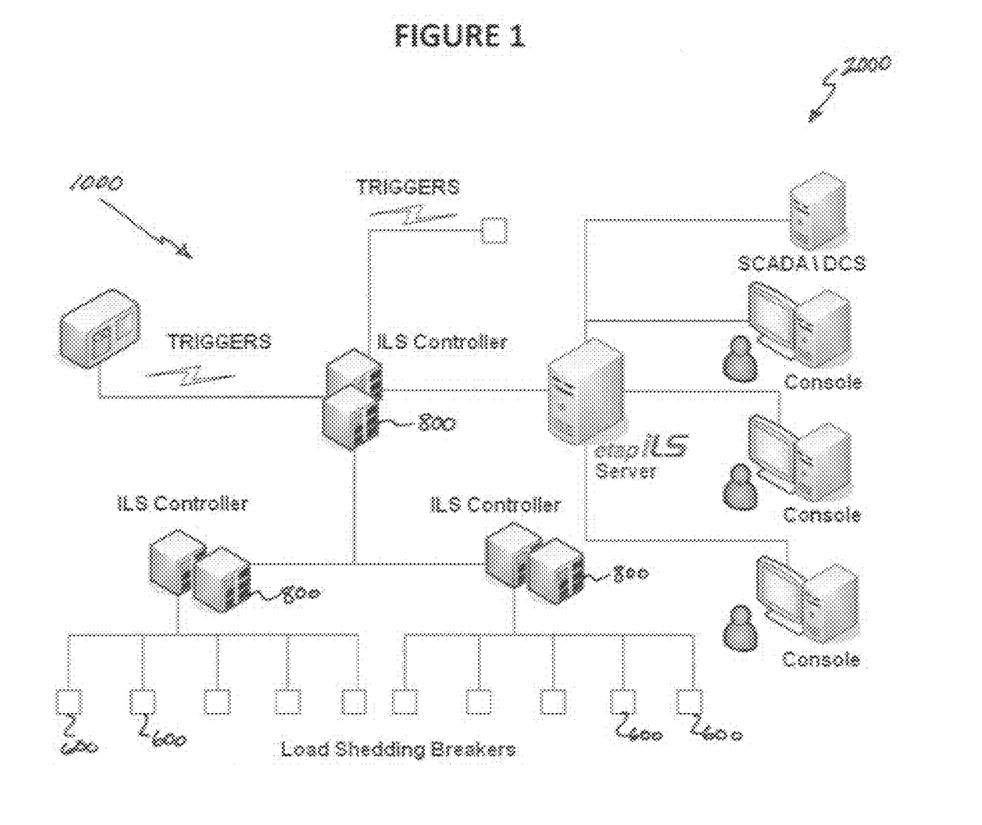
FIG. 1 illustrates a power control system according to at least one embodiment of the present invention.

FIG. 1 illustrates a power control system according to at least one embodiment of the present invention.

A power system 1000 comprises at least one power source 200 electrically coupled to at one or more loads 400. The power sources may be, for example, an on-site power generator but are not necessary limited thereto. The loads may be, for example, anything that requires electrical power to operate. The power system may also comprise one or more power control mechanisms 600 such as, for example, circuit breakers or relays, operable to selectively connect/disconnect one or more loads from one or more power sources in response to a power system control signal from a controller 800 that is communicatively coupled to the power control mechanisms. The power system may also comprise one or more substantially analogous power sub-systems.

The power system is electrically and communicatively coupled to a proactive load shedding system 2000. The proactive load shedding system comprises a proactive load shedding system server which may distributed across or more physical servers, each having processor, memory, an operating system, and input/output interface, and a network interface all known in the art.

In accordance with at least one embodiment, a power system model is generated from real-time power system operating data. Predictive contingencies are then run according to the model. Appropriate responses are generated and stored. When the contingency occurs, the appropriate response is retrieved and executed—shedding the appropriate loads (i.e. signal sent to controller to open switch).

The predictive contingencies may be according to known user inputted predictive contingencies. Appropriate responses are generated and stored. When the actual contingency occurs, the appropriate response is retrieved and executed—shedding the appropriate loads (i.e. signal sent to controller to open switch). When power system operating data changes, the process repeats so as to update/optimize the responses to the new system data.

The predictive contingencies may be system-generated predictive contingencies. The system may take the model and run a "what if" for every contingency. These contingencies may be ranked according to the level of threat they would have to system stability. They would then be ranked according to how fast the system would fail in the event of the contingency (i.e. how much time would the system have to initiate responsive action before failure became imminent). Then appropriate response are generated and stored according to the ranking When the actual contingency occurs, the appropriate response is retrieved and executed—shedding the appropriate loads (i.e. signal sent to controller to open switch). When power system operating data changes, the process repeats so as to update/optimize the responses to the new system data.

When power system operating data changes, the process repeats so as to update/optimize the responses to the new system data. For every defined trigger, a response is calculated, updated according to the real-time system operating data, and transmitted to the controller to be executed in the event of the associated contingency occurs. In this manner, the power control system adjusts to the dynamic effects of contingencies according to changing actual power system operating parameters.

Figure 2:
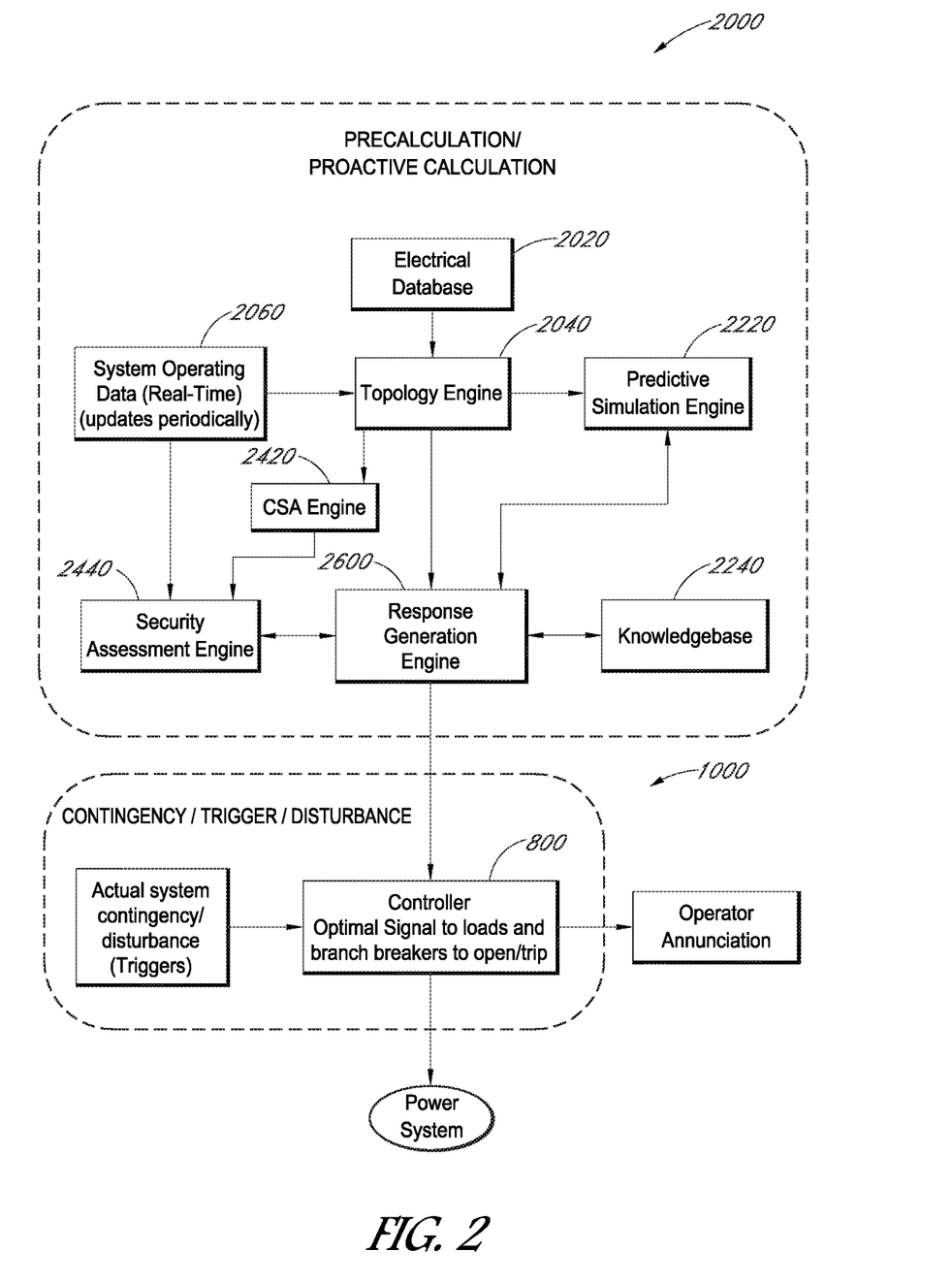
FIG. 2 illustrates a proactive load shedding system according to at least one embodiment of the present invention.

FIG. 2 illustrates an exemplary proactive load shedding system according to at least one embodiment of the present invention.

Real-Time Power System Topology

Figure 8:
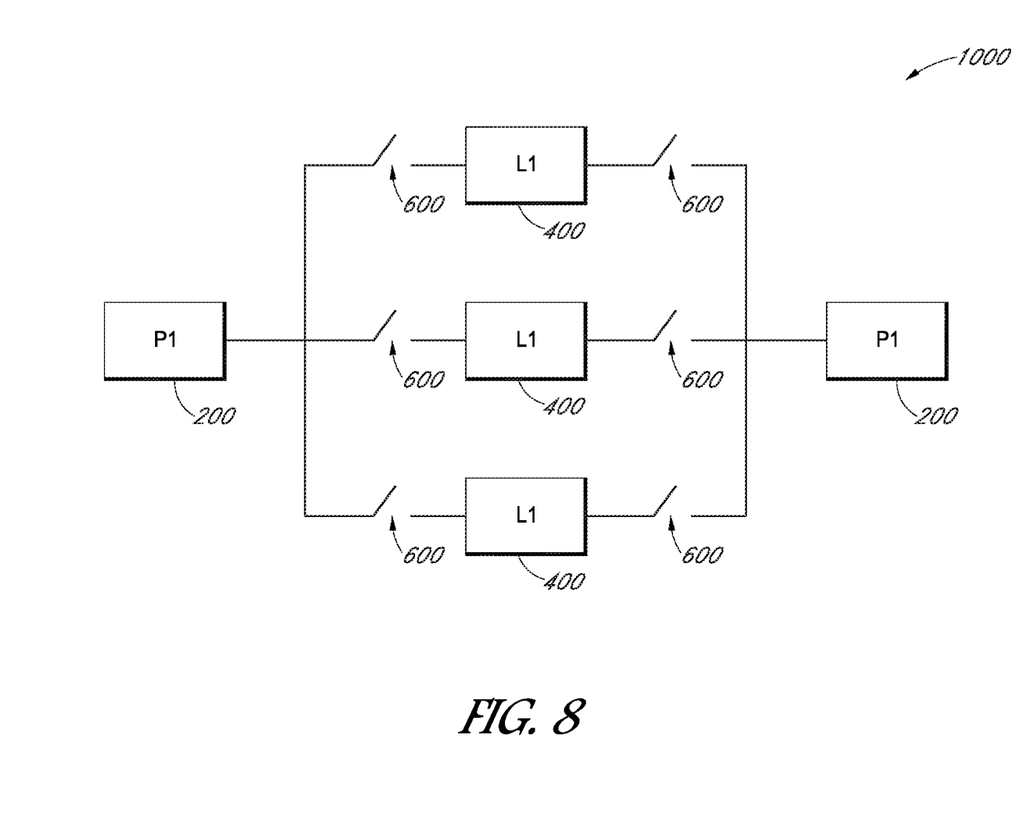
FIG. 8 illustrates a power control system according to at least one embodiment of the present invention.

As shown, for example, in FIG. 2, an electrical database 2020 retrievably stores data regarding the electrical connectivity between the components of the power system (e.g. the power sources and the loads), the data comprising one or more electrical models of the power system. For example, as shown in FIG. 8, three loads L1, L2 and L3 may be electrically coupled to two power sources P1 and P2. The electrical database would store data representing each of these connections, effectively mapping out and/or modeling all the electrical connections of the power system. In at least one embodiment, the electrical database retrievably stores data regarding the electrical connectivity between components of one or more power sub-systems.

Figure 4:
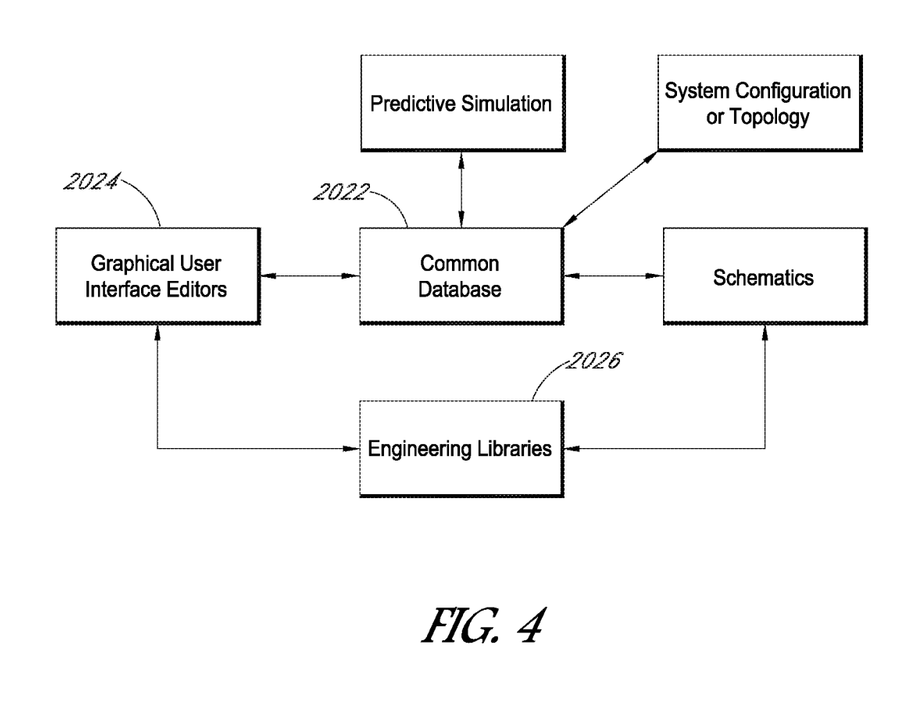
FIG. 4 illustrates a proactive load shedding system according to at least one embodiment of the present invention.

As shown, for example, in FIG. 4, computer models of electrical power systems are developed and maintained in a common database 2022. Users (e.g. engineers) develop these operating virtual models of electrical power systems via graphical user interface editors 2024 and engineering libraries of common components 2026. Separate data editors for Bus, Branch, and Machine data allow the user to model the system in the common database. The libraries, which may be user-edited libraries, provide typical data that can be substituted into the database upon request. When predictive studies are performed, as described herein according to at least one embodiment, the power control system automatically extracts the necessary power system parameters from the common database.

Returning to FIGS. 2 and 4, an electrical power system topology engine 2040 is communicatively coupled to the electrical database such that the topology engine can retrieve the electrical models of the power system stored therein. The topology engine receives real-time system operating data 2060 and generates a topology model of the power system based off of the electrical model and the real-time operating data of the power system as it is operating. For example, as shown in FIG. 8, power control mechanisms S1-S2 are shown in an "off" position as they would be if P1 was undergoing an event that required the shedding of loads L1 and L2.

According to at least one embodiment, the topology engine determines the connectivity of the electrical network, taking as input, a complete model of the network—provided by the electrical database—consisting of nodes and switching devices. The topology engine reduces the "node breaker" model to a "bus branch" model, where the concept of bus defines a maximal sub-network interconnecting nodes and closed switching devices only. In other words, the topology model is one that eliminates all switching devices from the network model by instantiating their "open" or "closed" status. In this manner, subsystems are identified using real-time system topology and power system electrical database such that load shedding calculations are handled independently in each isolated section. By operating according to sub-systems, the power control system according to at least one embodiment, will be better able to identify electrical events or triggers and compute the required load to be shed within each sub-system. The topology engine is used to determine sub-systems, which are sections of the system that are electrically isolated from each other.

Figure 5:
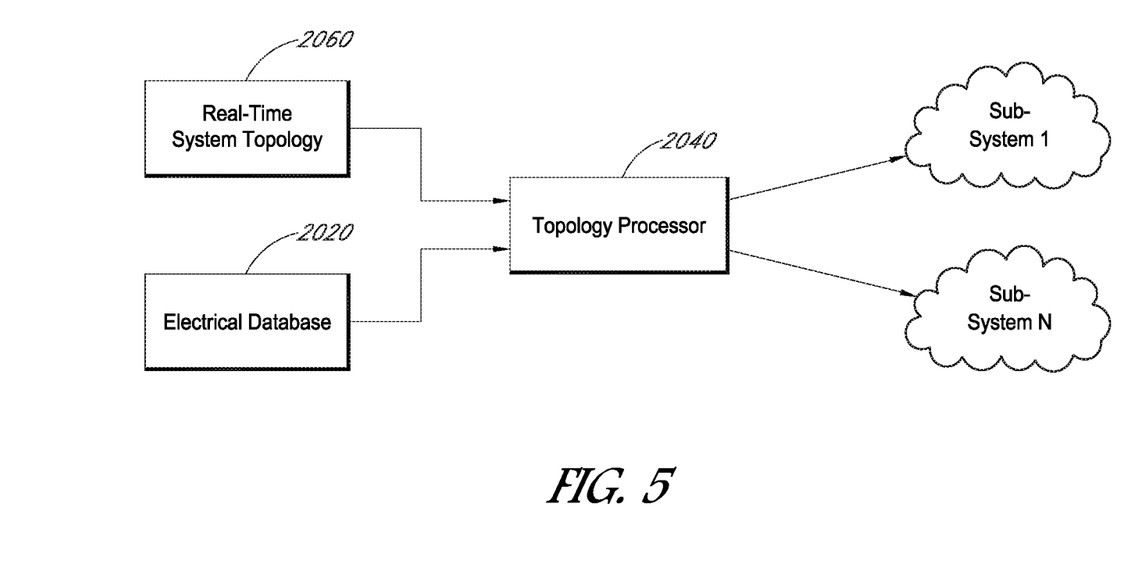
FIG. 5 illustrates a proactive load shedding system according to at least one embodiment of the present invention.

Thus, the topology model is a model of the actual operating conditions of the power system at the time the topology model is generated, i.e. "snapshot" of the power system. Because it receives real-time operating data, the electrical power topology engine keeps track of the status of the power control mechanisms (e.g. circuit breakers, isolator switches, fuses, transformer tap positions, etc.). It can therefore generate the topology model for the entire power system, or for one or more power sub-systems, as shown, for example, in FIG. 5.

Figure 3:
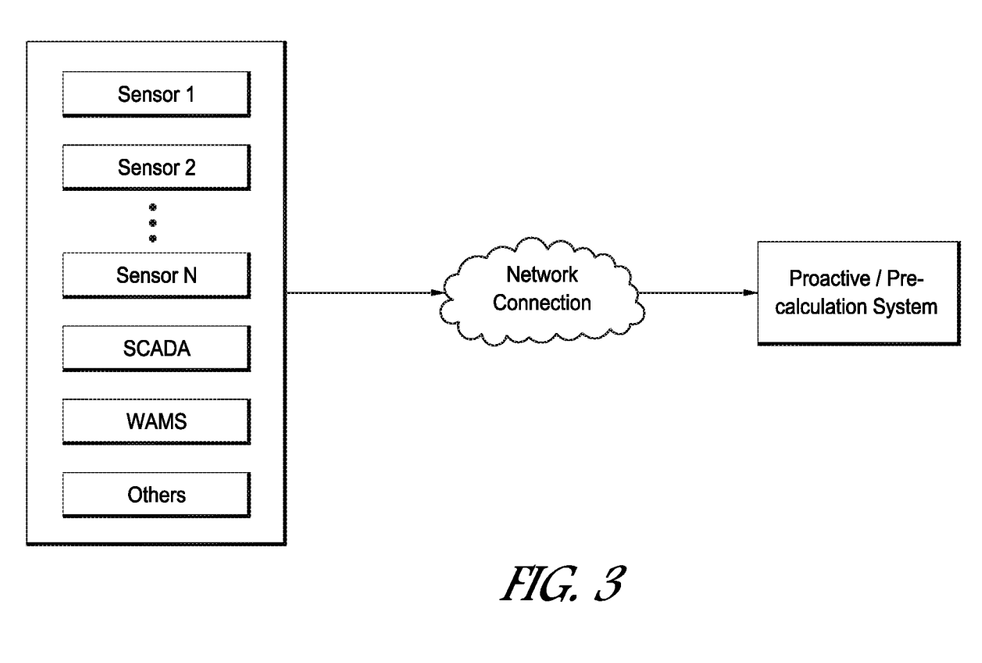
FIG. 3 illustrates a power control system according to at least one embodiment of the present invention.

As shown in, for example, in FIG. 3, the power control system according to at least one embodiment of the present invention acquires real-time data of the actual power system and monitors or calculates the pre-disturbance operating conditions, such as, for example, total system load demand, total system power exchange to the grid, generation of each on-site unit, spinning reserve for each on-site unit, control settings for each running unit, settings and loading conditions for all major rotating machines, system configuration and/or topology (e.g. tie-line numbers, tie-line status and power transferring, bus-tie status and flow, transformers and feeder status and loading, loading of each load, etc.). Real-time operating data may be gathered directly, for example, via sensors such as Intelligent Electronic Devices (IEDs), Phasor Measurement Units (PMUs) used for Wide Area Measurement (WAMs), transducers, Dynamic Disturbance Recorders (DDRB). Real-time operating data may also be gathered indirectly, for example, via a central data acquisition systems such as Supervisory Control & Data Acquisition (SCADA) or Distributed Control Systems (DCS). Real-time data preferably includes the electrical operating parameters of the system such as, for example, voltage, electrical power, reactive power, current, etc. Real-time data may, for example, indicate whether a contingency has occurred.

As discussed herein, the electrical power system topology engine generates topology models for power sub-systems in an analogous manner. By utilizing topology models for power-subsystems, load shedding activities may be executed independently according to each isolated power sub-system. Accordingly, the proactive load shedding system according to at least one embodiment identifies contingencies and computes the required load to be shed on a sub-system by sub-system basis. A result is that an event in one sub-system can be isolated to that sub-system and any potential system-wide degenerative effects may be mitigated.

Steady State System Assessment

As discussed herein, the proactive load shedding system according to at least one embodiment of the present invention utilizes both a steady state and dynamic assessment to proactively identify and evaluate contingencies that may result in load shedding, and to determine the optimal amount of load to be shed in response to each identified contingency.

The steady state assessment will now be discussed with reference to FIG. 2.

A predictive simulation engine 2220 is communicatively coupled to the topology engine and determines the likely effect of actual contingencies based on one or more predictive contingencies. The predictive contingencies are preferably pre-programmed into the system and are events that the engineer believes have a high likelihood of happening, and if they do, a high potential for causing system failure. For example, the predictive simulator may determine the effect of possible outages, such as loss of one or more branches (e.g. transmission lines, transformers, etc.) and/or generating units, to the power system.

According to at least one embodiment the predictive simulation engine utilizes the topology model to run the analysis. In this manner, the predictive simulation engine determines the effect of contingencies to the power system under the operating conditions as defined by the topology model. Accordingly, the power control system according to at least one embodiment of the present invention is able to apply engineer-determined contingencies to the actual operating conditions of the power system. Such analysis may be performed online or off-line.

According to at least one embodiment, the predictive simulation engine determines the ability of the power system to remain stable in the presence of slowly varying changes in the total demand. It accomplishes this by determining the maximum loadability of the power system, i.e. how much additional load the power system can carry without power system collapse, if load (and accordingly, generation and imports) is increased gradually. This determination is preferably made according to current power system operating conditions, i.e. according to the topology model.

The results of the analysis are utilized by the power control system to generate appropriate responsive actions, such as, for example, shedding one or more loads. The responsive action is such that execution of the response by the system would restore system stability.

A response generation engine 2600 is communicatively coupled to the predictive simulation engine and predictive response database. The response generation engine receives the predictive scenarios from the predictive simulation engine and generates predictive responses based thereon. The predictive responses may be software instructions that when executed cause the controller to selectively connect/disconnect one or more loads from one or more power sources, i.e. to shed a load. Preferably, the predictive response comprises an optimal load shedding operation. Generally, this process is completed offline, however it may also be completed online (i.e. during actual system operation).

A predictive response database 2240 is communicatively coupled to the predictive simulation engine and retrievably stores the responsive action associated with a given predictive contingency. In other words, the predictive response database is a knowledge base of appropriate system responses for certain system conditions and contingencies under those conditions. For example, the predictive response database will store instructions to shed a certain load combination according to a certain contingency that occurs while the system is in a certain operating state. In at least one embodiment, the stored responsive actions may correspond to predictive contingencies that are pre-programmed into the system. In at least one embodiment, the stored responsive actions may correspond to contingencies that are dynamically assessed, as discussed herein. Generally, this process is completed offline, however it may also be completed online (i.e. during actual system operation).

The system responses are retrievably stored in a memory of the controller. When an actual contingency is detected, the controller checks the memory for a corresponding system response to see how to deal with the actual contingency. If there is a match, it executes. In this manner, there is an automatic response to a detected contingency.

Exemplary static assessment systems are described, for example, in U.S. Provisional Application No. 61/666,716, filed on Jun. 29, 2012, the contents and disclosure of which are herein incorporated by reference.

Dynamic System Assessment

As discussed herein, the proactive load shedding system according to at least one embodiment of the present invention utilizes both a steady state and dynamic assessment to proactively identify and evaluate contingencies that may result in load shedding, and to determine the optimal amount of load to be shed in response to each identified contingency. The dynamic assessment will now be discussed with reference to FIG. 2.

A contingency & screening analysis ("CSA") engine 2420 is communicatively coupled to the topology engine and is operable to identify and rank the most severe disturbances (i.e. contingencies) that can cause the power system to become unstable. According to at least one embodiment, the CSA engine receives the topology model and identifies the full set of possible predictive contingencies for the current set of system operating parameters. The CSA engine may further identify those predictive contingencies whose effect on power system stability exceeds a user-defined threshold. In other words, the CSA engine identifies predictive contingencies that, if they were to occur, would constitute credible threats to the stability of the system. The CSA engine may also ranks those predictive contingencies that are credible threats according to their threat level.

Figure 6:
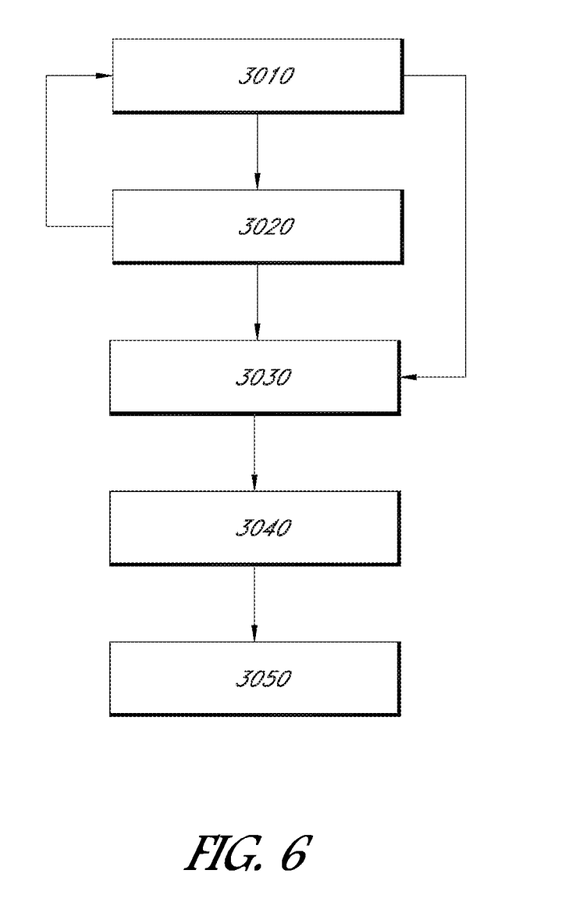
FIG. 6 illustrates a proactive load shedding method according to at least one embodiment of the present invention.

In at least one embodiment, the CSA engine applies a batch routine to the topology model in order to identify and rank predictive contingencies. FIG. 6 illustrates an exemplary batch routine according to at least one embodiment of the present invention.

Step 3010: The CSA engine checks whether the predictive contingency is part of an outage list. The outage list is a list of pre-identified contingencies that the contingency analysis engine is going to analyze. It defines the universe of outages and can range from all possible contingencies, to a select number of contingencies effecting select portions of the power system. If the predictive contingency is part of the outage list, the process continues with Step 3020. If the predictive contingency is not part of the outage list, i.e. it is not one to be checked (e.g. because it is already known that it will not have a significant effect), the process continues with Step 3030.

Step 3020: The CSA engine ranks the predictive contingency according to its effect on power system stability. In at least one embodiment, this is accomplished by the contingency analysis engine running a preliminary simulation based on the topology model, in which the predictive contingency is applied and the simulated effects on the power system are determined. In other words, the contingency analysis asks the question: if the contingency occurs, how many violations (i.e. instances of power system instabilities) are triggered? In at least one embodiment, the predictive simulation is an interpolation of the effects of the predictive contingency based on the effects of similar predictive contingencies whose effects are known. The predictive contingency is ranked according to the number of violations the predictive contingency triggers. The ranking process continues for every predictive contingency on the outage list until the outage list is fully ranked. The process then continues with Step 3030.

Step 3030: The CSA engine copies at least a portion of the outage list to an evaluation list. The predictive contingencies that are copied to the evaluation list are preferably determined by the number of associated violations, i.e. the seriousness of the contingency. For example, the evaluation list may be a list of the "top-10" contingencies, or it may be a list of those contingencies that meet a target threshold for threat level. The process then continues with Step 3040.

Step 3040: The CSA engine communicates the predictive contingencies to the security assessment engine on a by-rank priority. The security assessment engine then conducts a full analysis of the predictive contingencies according to the system and processes described herein.

Step 3050: As an additional step, the CSA engine may also generate a report according to the evaluation list that may be uploaded to a graphical user interface (or a database) to be reviewed by a user in connection with the power system.

In this manner, the contingency analysis engine preliminarily determines the systematic effect of all possible contingencies on the power system, screens out contingencies whose systematic effects do not meet a user-defined threshold threat level (i.e. are not credible threats), and ranks those contingencies that do meet the threshold according to the severity of the threat. For example, a contingency whose occurrence would cause a total system failure would have a high ranking.

A security assessment engine 2440 is communicatively coupled to the contingency analysis engine and the response generation engine. The security assessment engine runs a full security analysis of the predictive contingencies supplied by the CSA. In other words, for each predictive contingency, the security assessment engine determines the complete behavior of the power system and whether that behavior violates any limits such that system stability is at risk. This is accomplished by running an in-depth simulation in which the predictive contingency is applied to the topology model and the simulated effects on the power system are determined.

Determining the effects of the predictive contingency is preferably accomplished by running one or more stability calculations, including: transient stability (i.e. time domain) calculations, voltage stability (i.e. model) calculations, small signal stability (i.e. model) calculations, and electromagnetic transient calculations. The particulars of these calculations as applied to various data sets are generally known to those of ordinary skill in the art.

Determining whether the effects of the predictive contingency include security violations includes comparing those effects to security limits, assessing whether the effects exceed those limits, and determining whether the effects are dampening (i.e. returning to normal on their own). Such determination may include, for example, determining whether there is a rotator angle stability violation, a voltage and power limit violation, an available transfer limit violation, and/or a thermal limit violation.

According to at least one embodiment the predictive simulation engine utilizes the topology model to run the security analysis. In this manner, the predictive simulation engine determines the effect of contingencies to the power system under the operating conditions as defined by the topology model.

According to at least one embodiment, the predictive simulation engine determines the ability of the power system to remain stable in the presence of slowly varying changes in the total demand. It accomplishes this by determining the maximum loadability of the power system, i.e. how much additional load the power system can carry without power system collapse, if load (and accordingly, generation and imports) is increased gradually. This determination is preferably made according to current power system operating conditions, i.e. according to the topology model.

In at least one embodiment, the security assessment engine receives the ranked predictive contingencies from the contingency analysis and identifies the immediacy of the associated threat. Preferably, this is accomplished on highest-rank-first priority. In other words, the security assessment engine analyzes the most severe contingencies to determine, if the contingency happened under the present system operating parameters, how long before the threat to system stability would be realized. For example, for a contingency whose occurrence would cause a total power system failure, the model analysis engine determines how long from the occurrence of the contingency until the power system failed. In this manner, the system according to at least one embodiment of the present invention further prioritizes which predictive contingencies to develop predictive responses to.

The predictive response generation engine then determines the appropriate remedial action according to the predictive contingency, the topology model, the predictive simulation, and/or the predictive response database, as discussed herein. In at least one embodiment, the predictive response engine compares the topology model and real-time data with similar predictive contingencies for which predictive remedial actions are known, and interpolates a predictive remedial action based thereon. In at least one embodiment, the predictive response generation engine conducts a trial and error calculation, in which a predictive remedial action is introduced into the simulation and the simulation is checked to determine whether the remedial action returns the simulated power system to stable operating conditions. If not, another predictive remedial action is tried until one is found that accomplishes that goal. The predictive responses are downloaded to respective power system controllers and stored so as to be automatically retrievable in the event the actual contingency occurs.

It is important to note that this analysis is dynamic, based on the system operating data in real-time. The effect is as the system changes, the contingencies passed on by the contingency analysis/modal analysis will be analyzed (and reactions generated) on a priority basis according to the most critical contingencies of the current system operating parameters. This means, the system is not likely to do a full analysis of any given set of operating parameters at one time. Instead, the system continues to analyze the most important contingencies for the set of system parameters the system is currently operating under. As those system parameters oscillate, lower ranked contingencies will be filled in, leading to a full and complete predictive response database.

Once that occurs, the contingency analysis engine will retrieve the current real-time data and will re-load the controllers with all the known responses to every possible contingency—on a priority system according to critical-ness of the predictive contingency. In this manner, the system can accurately predict responses for contingencies according to the real-time system data without the lag time present in prior art systems.

Importantly, this analysis occurs according to the power subsystems that are identified using the real-time system topology. In this manner, load shedding calculations are handled independently for each isolated section. By operating according to sub-systems, the power control system according to at least one embodiment, will be better able to identify electrical events or triggers and compute the required load to be shed within each sub-system. Accordingly, the predictive contingencies that, for example, are limited to isolated subsystems and therefore would have a limited effect on the power system as a whole, can be identified and the calculation of an appropriate response thereto can be postponed in favor of predictive contingencies whose effect is system wide. In other words, according to at least one embodiment, contingency prioritization is enabled at least in part because of the subsystem by subsystem analysis. This is particularly important during dynamic system assessment, because of the sheer volume of calculations required to be undertaken to determine every possible contingency in real-time. Under these circumstances, prioritization is highly beneficial.

The predictive response engine continually evaluates the generated remedial actions associated with the various predictive contingencies. For each contingency, it compares the event and corresponding system behavior with the predictive response database. But utilizing weighing factors, the predictive response engine is able to identify the appropriate remedial action required to return the system to a stable condition. These calculations are preferably performed on a continuous basis, prior to any disturbance, event or contingency occurring.

Figure 7:
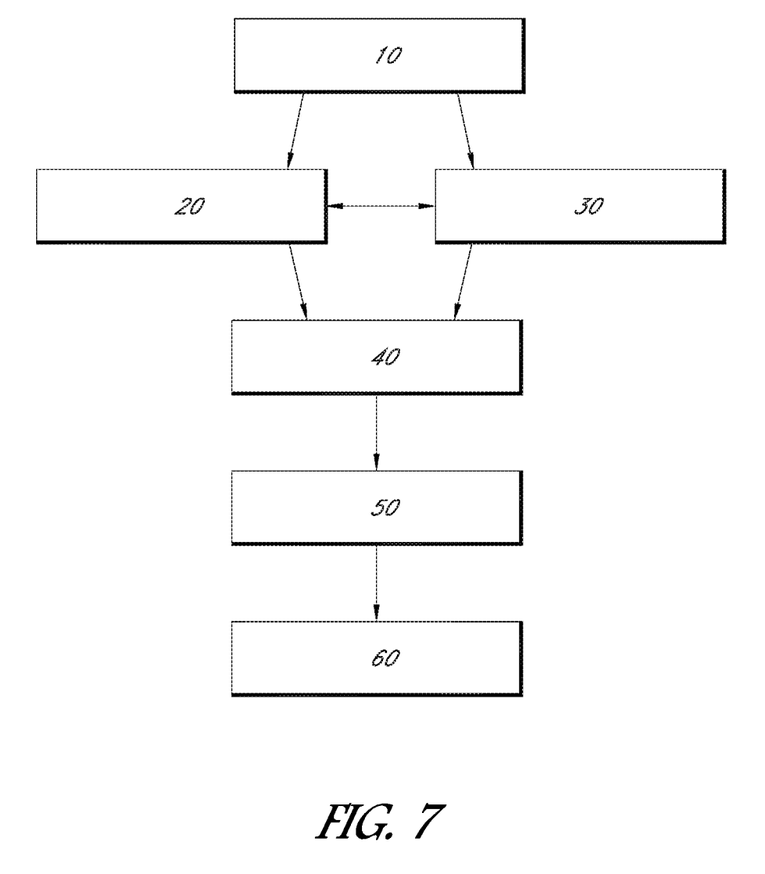
FIG. 7 illustrates a proactive load shedding method according to at least one embodiment of the present invention.

A proactive load shedding method will now be discussed with reference to FIG. 7.

Step 10: A topology model is generated based on real-time power system operating data and an electrical model, as discussed herein. The electrical model identifies all the electrical connections of the power system. The real-time operating data is gathered via sensors. The topology model is a model of the actual operating conditions of the power system at the time the topology model is generated, i.e. "snapshot" of the power system. Because it receives real-time operating data, the electrical power topology engine keeps track of the status of the power control mechanisms and is in effect, a reduction of the "node breaker" model to a "bus branch" model.

Step 20: The effects of preprogrammed predictive contingencies to the power system under the operating conditions as defined by the topology model are determined, as discussed herein. The pre-programmed predictive contingencies are events that the engineer believes have a high likelihood of happening, and if they do, a high potential for causing system failure.

Step 40: The effects of real-time predictive contingencies to the power system under the operating conditions as defined by the topology model are determined and ranked based on the severity of the effect and the imminence of the effect, as discussed herein. The full spectrum of predictive contingencies that could occur to the power system under the operating conditions as reflected in the topology model are identified. Those predictive contingencies are ranked according to the severity of their effect on the power system and the imminence of the effect.

Step 50: Appropriate responsive actions to the predictive contingencies (both preprogrammed and real-time) are determined and retrievably stored, as discussed herein. The appropriate responsive actions to each real-time predictive contingency are determined in priority order of the ranking Step 60: If an actual contingency is detected that aligns with a predictive contingency for which an appropriate responsive action has been determined, the responsive action is executed in response to the actual contingency. The predictive responses are downloaded to respective power system controllers and stored so as to be automatically retrievable in the event the actual contingency occurs that matches the predictive contingency. As the system operating conditions change, the predictive contingencies analyzed (and reactions generated) will likewise change, continually analyzing and retrievably storing the most important contingencies for the current system operating conditions. The set of responses (e.g. priority tables) to predictive contingencies associated with the current system operating conditions are continually loaded to the controllers to be quickly retrieved in the event of an actual contingency.

It should be noted, that while the embodiments of the present invention are herein described primarily with respect to load shedding in response to transient stability analysis, the present invention has equal applicability to general security assessment, as would be understood by one of ordinary skill in the art.

Security assessment includes various calculations, such as transient stability, electromagnetic transient stability, voltage stability and small signal stability. The power control system identifies cases that can potentially lead to system violations (i.e. power system instability) and performs detailed dynamic calculations from a system stability perspective—both short term and long term. These cases are run either using offline information (e.g. planning models) and/or online information (i.e. real-time topology models). The real-time information may be based on the power system operating conditions at the moment prior to any disturbance and may include, for example, information such as, system load, location, wind speed, solar irradiance, etc.

The results of the security assessment may then be compared against system security violations, such as, undervoltage, overvoltage, power transfer limits, thermal loading, etc., to filter contingencies or triggers that require corrective action from a dynamic performance point of view. During an initial training of the power control system, remedial actions are evaluated by the engineer that can include, for example, real power adjustment by means of load shedding, reactive power adjustment by means of capacitor banks, system islanding by intentionally isolating healthy sub-systems from unstable behavior, changing protection schemes or settings to make the system more or less sensitive to disturbances.

The present invention may be provided as a computer program product which may include a machine-readable medium having stored thereon instructions which may be used to program a computer (or other electronic devices) to perform a process according to the present invention. Moreover, the present invention may also be downloaded as a computer program product, wherein the program may be transferred from a remote computer to a requesting computer by way of data signals embodied in a carrier wave or other propagation medium via a communication link.

It should be noted that while the embodiments described herein may be performed under the control of a programmed processor, in alternative embodiments, the embodiments (and any steps thereof) may be fully or partially implemented by any programmable or hard coded logic. Additionally, the present invention may be performed by any combination of programmed general purpose computer components or custom hardware components. Therefore, nothing disclosed herein should be construed as limiting the present invention to a particular combination of hardware components.

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. An electrical power control system comprising:
a power system having one or more subsystems and electronically connected to one or more loads;
a load shedding system communicatively coupled with and operable to receive real-time data gathered directly, indirectly or through a combination thereof regarding the power system at a server comprising:
at least one controller; and
a non-transitory computer readable memory storing instructions that, when executed cause the load shedding system to selectively and proactively disconnect one or more loads, subsystems or combinations thereof from the power system by using the controller to:
receive the real-time data regarding the power system and subsystems thereof, loads and electrical connections;
identify whether a predictive contingency has occurred in the power system based on at least one predefined trigger by determining whether the identified predictive contingency is an outage-identified predictive contingency that is included in an outage list stored in non-transitory computer readable memory that includes a plurality of selected predictive contingencies, and if so, identify a type and subsystem location for the outage-identified predictive contingency, wherein the outage list is predefined based on user input, is system-generated or combinations thereof;
calculate an optimal load-shedding response to the outage-identified predictive contingency based on a dynamic assessment of the received real-time data; and
selectively disconnect one or more loads, subsystems or combinations thereof from the power system according to the optimal load-shedding response, wherein the dynamic assessment further comprises:
determining a quantity of violations that would be triggered by the outage-identified predictive contingency;
comparing the quantity of violations with quantities of violations for any other outage-identified predictive contingencies; and
ranking for each outage-identified predictive contingency according to their respective quantities;
generating a selected listing of outage-identified predictive contingencies that includes outage-identified predictive contingencies whose quantity of violations meets or exceeds a target threat level threshold;
conducting an analysis of the selected listing and determining remedial actions for the outage-identified predictive contingencies of the selected listing, prioritized based on the rank of each outage-identified predictive contingency; and
selectively generating a report to be reviewed by a user.

2. The electrical power control system of claim 1, wherein the optimal load-shedding response is further based on:
a steady-state assessment.

3. The electrical power control system of claim 2, wherein the steady-state assessment further comprises:
determining the ability of the power system to remain stable based on slowly varying changes in total demand by determining a maximum loadability of the power system according to current operating conditions that is sustainable without causing total power system collapse.

4. The electrical power control system of claim 1, wherein selectively disconnecting one or more loads, subsystems or combinations thereof according to the optimal response occurs when the power system is on-line.

5. The electrical power control system of claim 1, wherein selectively disconnecting one or more loads, subsystems or combinations thereof according to the optimal response occurs when the power system is off-line.

6. The electrical power control system of claim 1, wherein the load shedding system is operable to receive data regarding the power system and to selectively and proactively disconnect one or more loads, subsystems or combinations thereof from the power system for every sub-system of the power system.

7. The electrical power control system of claim 6, wherein the load shedding system is operable to receive data regarding the power system and to selectively and proactively disconnect one or more loads, subsystems or combinations thereof from the power system for every sub-system of the power system and is further operable to perform load shedding for disconnected sub-systems.

* * * * *

UNITED STATES PATENT AND TRADEMARK OFFICE
CERTIFICATE OF CORRECTION

PATENT NO. : 9,705,329 B2  
APPLICATION NO. : 13/933014  
DATED : July 11, 2017  
INVENTOR(S) : Shokooh et al.

Page 1 of 1

It is certified that error appears in the above-identified patent and that said Letters Patent is hereby corrected as shown below:

On the Title Page

Item (12) Line 2, delete the name "Khandelwal" and insert  
--Shokooh et al.-- and  
At Item (72) Inventors: Before the name Tanuj insert  
--Farrokh Shokooh, Laguna Beach, CA (US)--

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*